United States Patent [19]

Ishikawa et al.

[11] Patent Number: 5,143,442
[45] Date of Patent: Sep. 1, 1992

[54] PORTABLE PROJECTION DEVICE

[75] Inventors: Masaaki Ishikawa, Tokyo; Masao Yamada, Tachikawa, both of Japan

[73] Assignee: Tamapack Co., Ltd., Tokyo, Japan

[21] Appl. No.: 696,643

[22] Filed: May 7, 1991

[51] Int. Cl.$^5$ .............................................. F21V 33/00
[52] U.S. Cl. ..................... 362/253; 362/184; 362/196; 362/205; 362/208; 362/800
[58] Field of Search ............... 362/800, 184, 196, 231, 362/208, 205, 253; 350/345

[56] References Cited

U.S. PATENT DOCUMENTS

| | | | |
|---|---|---|---|
| 2,764,058 | 9/1956 | Ellis | 362/268 |
| 3,401,596 | 9/1968 | Hirsch | 362/806 |
| 4,386,826 | 6/1983 | Stolov | 350/345 |
| 4,573,766 | 3/1986 | Bournay, Jr. et al. | 350/345 |
| 4,756,604 | 7/1988 | Nakatsuka et al. | 350/345 |
| 4,866,580 | 9/1989 | Blackerby | 362/205 |
| 4,893,903 | 1/1990 | Thakar et al. | 350/345 |
| 4,947,291 | 8/1990 | McDermott | 362/800 |

Primary Examiner—Ira S. Lazarus
Assistant Examiner—Sue Hagarman
Attorney, Agent, or Firm—Lowe, Price, LeBlanc & Becker

[57] ABSTRACT

A portable projection device has a case-like body made of synthetic resin and formed hollow in which a lens, a circuit connected to a light emitting means, a power source and resistances, a display film and a film setting section are arranged and housed. The circuit is opened and closed by a switch arranged on the case-like body to thereby render the portable projection device operative and inoperative. The portable projection device can be used as a time-displaying timepiece, a flashlight, an alarm lamp, a guide lamp or the like.

10 Claims, 7 Drawing Sheets

PORTABLE PROJECTION DEVICE

BACKGROUND OF THE INVENTION

The present invention relates to a portable projection device and, more particularly, to a portable projection device in which display films are detachably interposed between a light emitting means and a lens system to project various kinds of messages onto a surface of the wall or ceiling and which can be used in various way as a time or guide display or an alarm lamp, for example.

Various light-producing devices such as flashlights, alarm and guide lamps, and slide projectors are well known. However, each of these devices has a single function, i.e., there is no single device that can achieve all of these functions. Thus, separate devices must be bought to achieve different functions. This is uneconomical and when they are not being used, they take up more space than a single, multipurpose device.

A plurality of devices provided with liquid crystal display elements (LCDs) have recently been produced. These LCDs have formed various kinds of images such as faces of clocks and display boards of word processors. However, these images cannot be seen in the dark.

Other well-known devices such as slide projectors, by which pictures, messages and the like formed on films are displayed on a screen are also produced. However, these devices are used on a table or hanging from a wall and therefore cannot allow the user to see the displayed images at any place he wants in the dark.

In addition to such projecting devices as slide projectors described above, light emitting devices such as portable pen lights and flashlights are also well known. However, these devices are used only for illuminating and signaling purposes and are not suitable for use as media for displaying pictures and messages.

The present invention is intended to solve the problems above. A main object of the present invention is to provide a handy and portable projector for easily projecting pictures and messages onto a surface of a wall or a ceiling.

SUMMARY OF THE INVENTION

According to an example of the portable projection device of the present invention, a liquid crystal display element is interposed between a light-passing hole in a wall of a case-like body and a light emitting means located opposite the hole. The light emitting means is intermittently flickered to attract attention.

According to another aspect of the present invention, a portable projection device comprises a light emitting means, a power source for turning on the light emitting means, an opening through which a display film is set in the device, and a lens system. Light emitted by the light emitting means is passed through the display film and through the opening, and the image on the display film is then projected, as an enlarged image, onto a surface through the lens system.

DETAILED DESCRIPTION OF THE PREFERRED EMBODIMENTS

The following explanation describes embodiments of the present invention.

Figure 1:
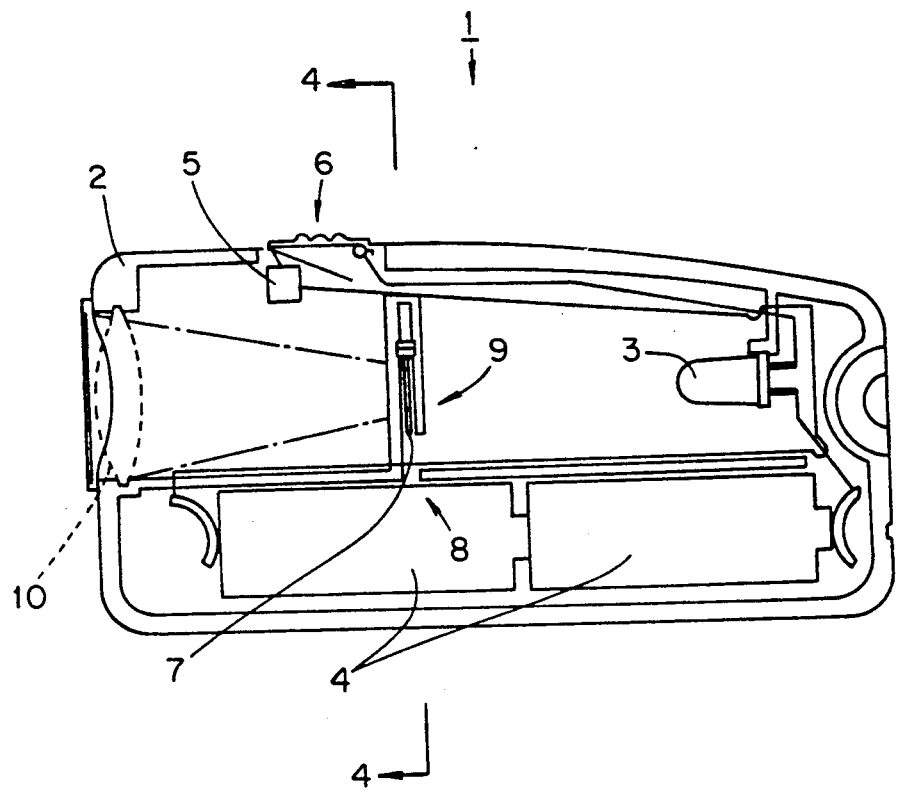
FIG. 1 is a configuration diagram of an embodiment of a portable projection device applied with the present invention.

FIG. 1 is a configuration diagram of an embodiment of a portable projection device applied with the present invention. The portable projection device 1 comprises a body 2, a light source 3 serving as a light emitting means, a power source 4 for supplying current to the light source 3, a resistance 5 for adjusting the voltage supplied to the light source 3, a switch 6 for opening and closing a circuit for turning on and off the light source 3, a display film 7 on which pictures, messages or the like are formed to be displayed as will be later described in detail, a film set section 9 having an opening 8 through which the display film 7 is set at the film set section 9, and a lens system 10 for projecting the pictures, messages or the like which are formed on the display film 7.

When a high-brightness light-emitting diode which can be driven by voltage of 3 V, for example, is used as the light source 3, sufficient brightness can be created and consumed power can be minimized. This enables cheap galvanic cells or dry cells or the like to be used as the power source 4. The switch 6 for opening and closing the circuit for turning on and off the light source 3 is projected outside the body 2 to enable the operator to operate the switch 6 from outside the body 2. The resistance 5 in the circuit serves to adjust voltage applied to the light source 3 but it is not essential to the device.

Figure 2:
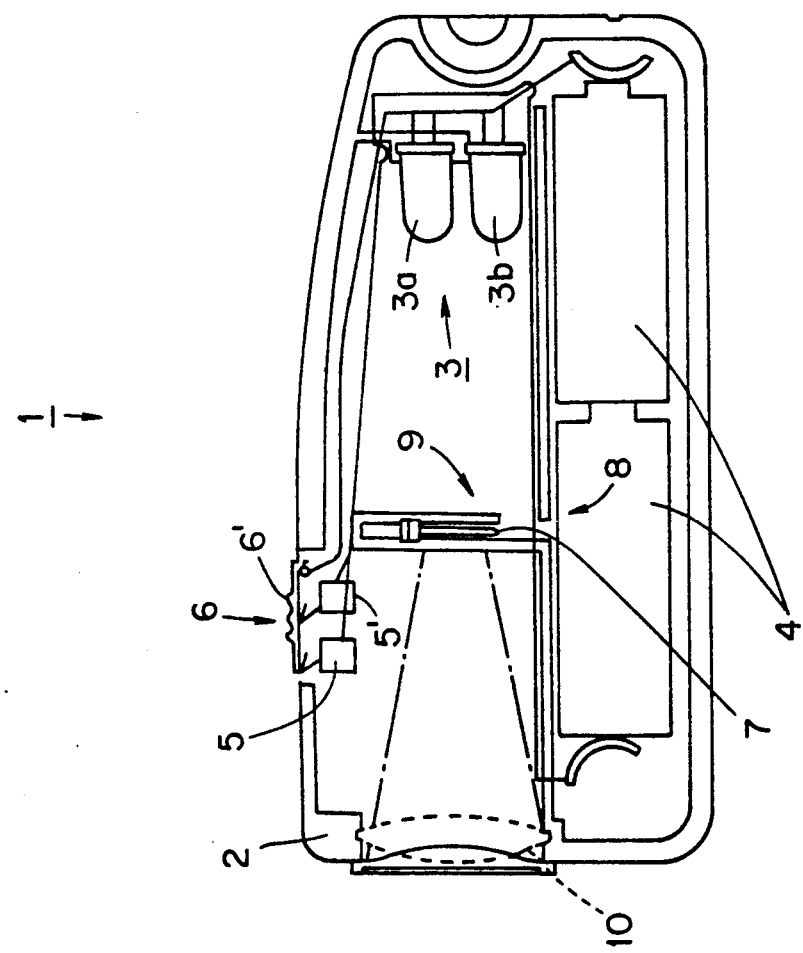
FIG. 2 is a configuration diagram of another embodiment of a portable projection device applied with the present invention.

A single light source 3 is provided in an embodiment as shown in FIG. 1, but multiple light sources can be provided as shown in FIG. 2. These light sources 3 can be, for example, a light emitting diode 3a as one light source 3, and as another light source 3 a light emitting diode 3b that emits light of equal brightness level to the light emitting diode 3a or a light emitting diode 3b that emits light of higher or lower brightness level than the light emitting diode 3a. Either of these light emitting diode 3a or 3b is emitted first by the switch 6. Then, both of the light emitting diodes 3a and 3b are simultaneously emitted by the switch 6, thereby adjusting the brightness. The light emitting diodes 3a and 3b can have different colors of light, for example, a combination of red and green. Different color lights can be easily discriminated and useful when used as signs in the dark in the distance beyond audibility (a sign, for example, to inform of the location of the user of the light). The switch 6 is a sliding-type switch with the thin conductive panel applied to the back of the operating panel 6'. The thin conductive panel is applied so that it is touchable with the light emitting diode 3a or 3b at the contact point between the the diode 3a or 3b and the resistance 5 or 5'. The common contact point is connected to the power source 4. The light emitting diodes 3a and 3b are fixed at their edge portions into the groove of the supporting wall projected from inside of the body.

In another configuration of this embodiment, different brightness levels in different light colors can be used for the light emitting diodes 3a and 3b respectively.

Figure 3:
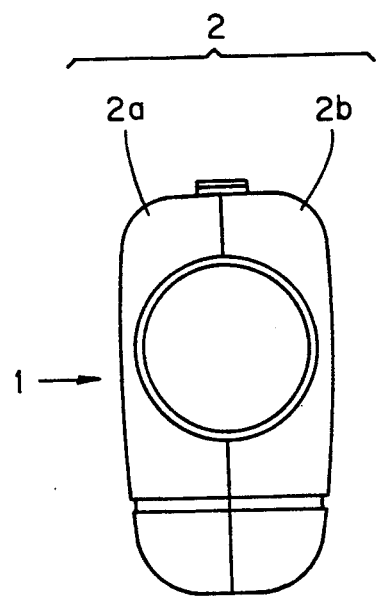
FIG. 3 is a front view of an embodiment of a portable projection device applied with the present invention.

FIG. 3 is a front view of an embodiment of a portable projection device applied with the present invention. The body 2 comprises right and left halves 2a and 2b injection-molded of synthetic resin or the like. These portions of the right and left halves 2a and 2b which are connected to each other have corresponding concave and convex portions (not shown in FIG. 2) for easy assembly, forming one body 2.

Figure 5:
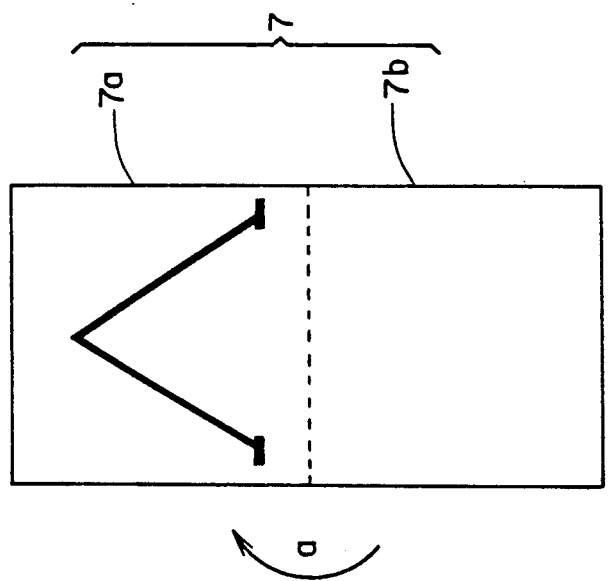
FIG. 5 shows an example of a display film applied to the present invention.
Figure 4:
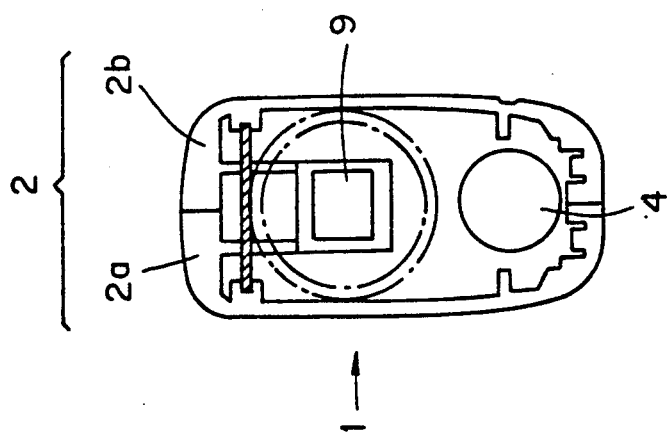
FIG. 4 is a sectional view along the line 4—4 in FIG. 1.

FIG. 4 is a sectional view along line 4—4 in FIG. 1, and FIG. 5 shows an example of the display film which can be applied to the portable projection device. In FIGS. 4 and 5, the power source 4 and the display film 7 are set in the device after the right and left halves 2a and 2b of the body 2 are disassembled, laying the body 2 open as described above. When the power source 4 and the display film 7 are thus set in the device, the right and left halves 2a and 2b are reconnected as a unit to form the body 2.

The display film 7 comprises an image area 7a on which an image (V in this case) is formed upside down, and a transparent light-permeable area 7b. After the light-permeable area 7b is overlapped on the image area 7a in the direction shown by the arrow "a" in FIG. 4, the display film 7 is set in the film set section 9 of the portable projection device 1 (FIG. 4) through the opening 8 (not shown in FIG. 4) such that the image on the display film 7 is laid upside down.

The following explanation describes how to use an embodiment of a portable projection device applied with the present invention configured as described above.

The display film 7 in FIG. 5 is set in the film set section 9 with its image kept upside down, as described above. When the image on the display film 7 is to be displayed, the front of the portable projection device 1 is directed toward the surface of the wall or ceiling in the dark and the switch 6 is turned on. The display film 7 is thus shot from behind by the light source 3 and the image on the display film 7 is projected on the surface of the wall or ceiling, as an enlarged image, onto the surface through the lens system 10. The portable projection device can therefore achieve a much higher display effect in the dark.

A red high-brightness light-emitting diode may be used as the light emitting means of another embodiment of the present invention. With this kind of diode, consumed power can be minimized. In addition, the image displayed on the surface is red. Therefore, the device can be used to display a danger signal, which can further widen its field of use.

Figure 6:
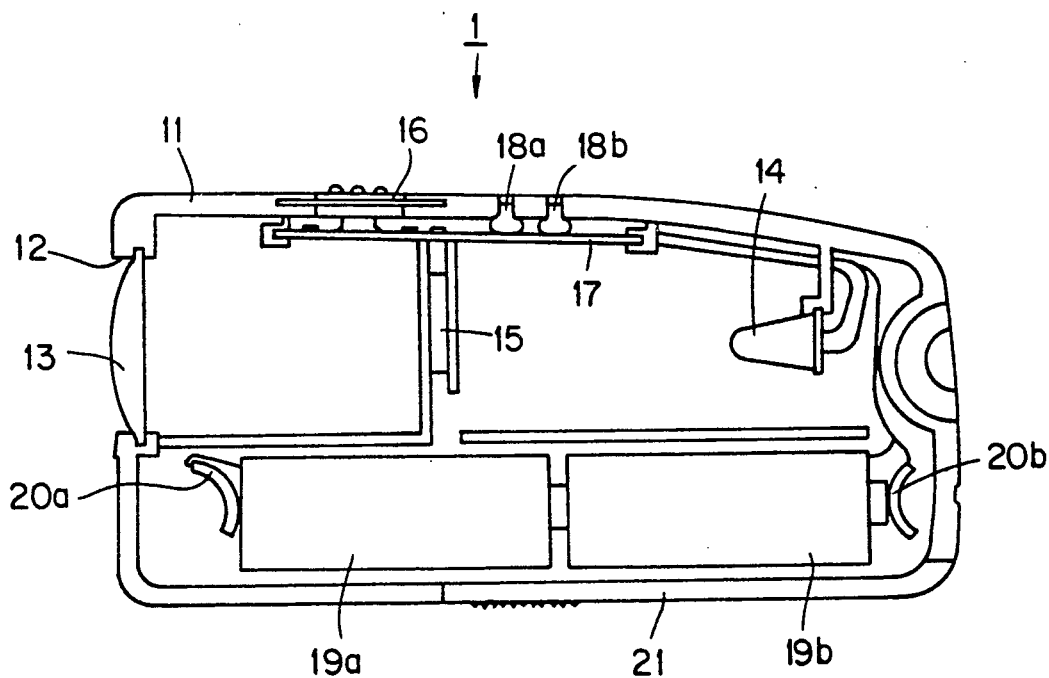
FIG. 6 is a configuration diagram of the internal mechanism of the portable projection device applied with the present invention.
Figure 7:
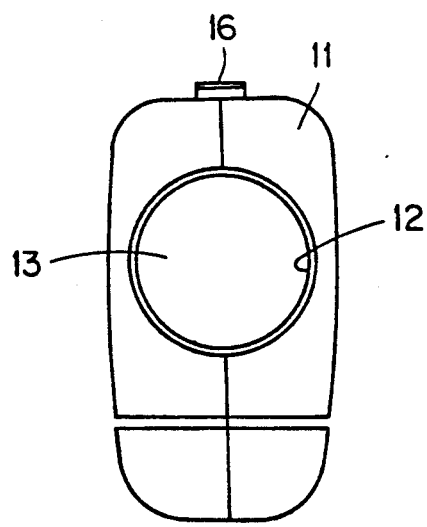
FIG. 7 is a front view of the portable projection applied with the present invention.

FIG. 6 is a configuration diagram of the internal mechanism of the portable projection device applied with the present invention and FIG. 7 is a front view of this device. In these Figures, the portable projection device 1 has a case-like body 11, and a light-passing hole 12 is formed in its front wall. A lens 13 is located in the light-passing hole 12, with its outer circumference fitted into a groove formed on the body 11 along the rim of the hole 12.

A light emitting element 14 which serves as the light emitting means is located opposite the light-passing hole 12 and inside the body 11 on the rear side thereof. As seen in the case of the lens 13, it is fixed to a support projected downward from the ceiling of the body 11, with its collar fitted into a groove on the support. A plate-like liquid crystal display element 15, which is substantially transparent when no current is supplied to it, is located between the light-emitting element 14 and the lens 13 sandwiched between two support walls projected downward from the ceiling of the body 11. These two support walls are provided with holes through which light emitted from the light-emitting element 14 passes to the light passing hole 12. A transparent plate is sometimes used instead of the lens 13.

A slide switch 16 for controlling an electronic circuit (described later) is freely slidably arranged on the top of the body 11, and is connected to a substrate 17 (described later) on which the electronic circuit is formed. Time adjusters 18a and 18b for controlling the time function of an IC 23 (described later) are provided on the top of the body 11 and on the right side of the slide switch 16. Each of these time adjusters 18a and 18b, made of soft plastic, has a convex section and conductive rubber is stuck to the side facing the substrate 17. When these adjusters are pushed from outside, therefore, they short-circuit the circuit on the substrate 17, thus sending pulses to the IC 23.

Dry cells 19a and 19b are connected in series to serve as the power source. They are located on the bottom of the body 11 and connected to the substrate 17 via electrodes 20a and 20b. These cells can be exchanged with new ones after a slidable lid 21 is detached from the body 11.

Figure 8:
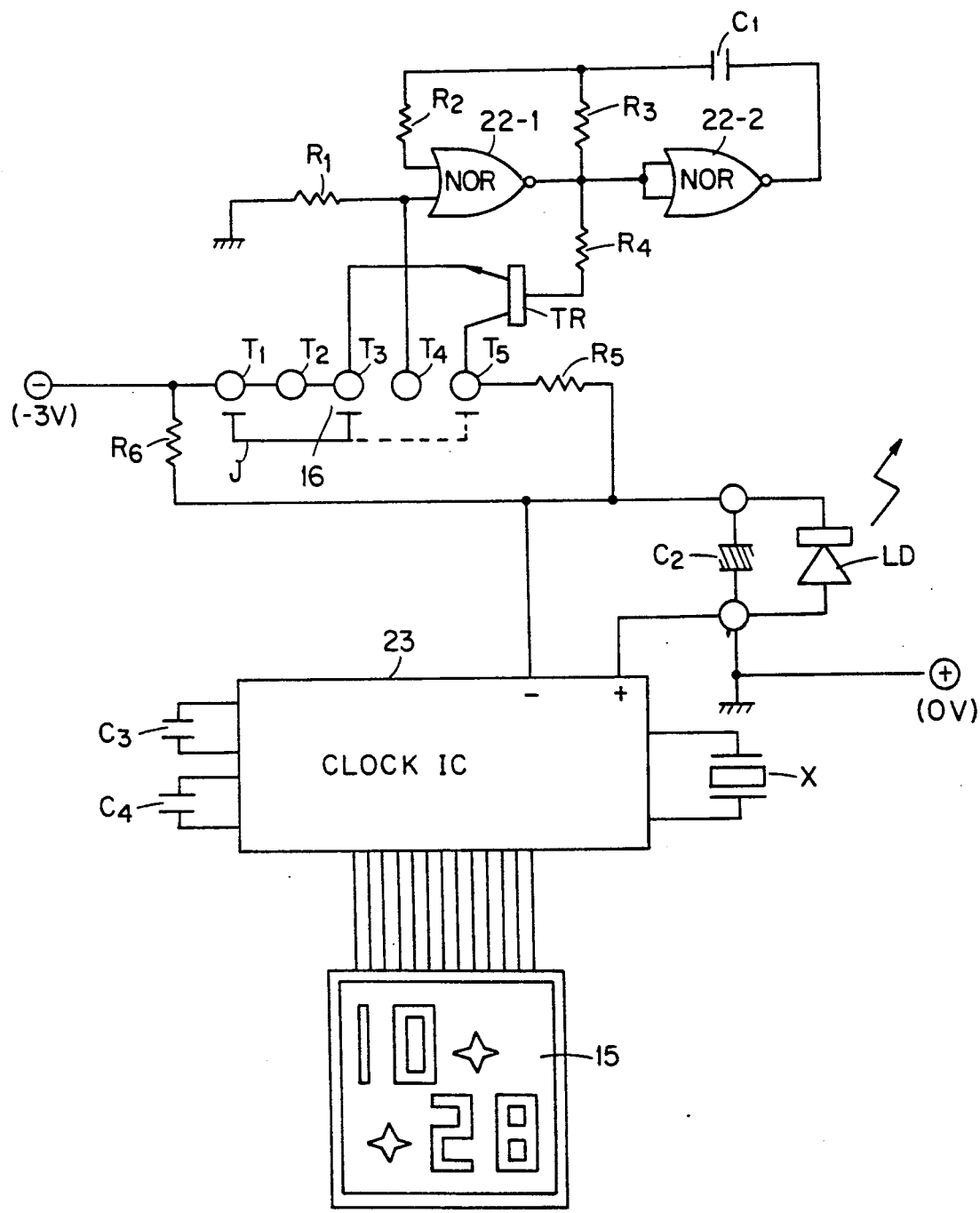
FIG. 8 is a block diagram of an example of the electronic circuit used for the portable projection device applied with the present invention.

FIG. 8 is a block diagram showing an arrangement of the electronic circuit formed on the substrate 17. In this FIGURE, an input terminal of the NOR gate 22-1 is grounded via a resistance $R_1$ and also connected to a contact $T_4$ of the slide switch 16, while another input terminal thereof is connected to an output terminal thereof through resistances $R_2$ and $R_3$, connected in series. One terminal of a capacitor $C_1$ is connected between the resistance $R_2$ and the resistance $R_3$, and the other terminal is connected to an output terminal of a NOR gate 22-2. Both input terminals of the NOR gate 22-2 are connected to the output terminal of the NOR gate 22-1. The NOR gate 22-2 can thus serve as an inverter and operate together with the NOR gate 22-1 to form an oscillator circuit. A base of a switching transistor TR which serves to turn on and off a light emitting diode (described later) is connected to the output terminal of the NOR gate 22-1 via a resistance $R_4$, while the emitter and collector thereof are connected to contacts $T_3$ and $T_5$, respectively of the slide switch 16. This contact $T_5$ is connected to a cathode of a light emitting diode LD which serves as the light emitting element 14 and to an end of a capacitor $C_2$ through a resistance $R_5$, and both the anode of the light emitting diode LD and the other terminal of the capacitor $C_2$ are earthed. A red high-brightness light-emitting diode should be used as the abovementioned diode LD.

The contact $T_3$ is connected commonly to contacts $T_2$ and $T_1$, and also to the minus electrode 20a of one of the dry cells. The minus electrode 20a is further connected to a minus terminal of the IC 23 via a resistance R$_6$. The plus electrode 20b of the other the dry cell is earthed. A contact of a slide switch 16 is selected by a jumper J.

Connected to the IC 23 are a crystal oscillator X for creating a reference frequency to obtain a time signal, the liquid crystal display element 15 and the like. Capacitors C$_3$ and C$_4$ serve to adjust frequency oscillated from the crystal oscillator. The IC 23 and the liquid crystal display element 15 are connected by a flexible substrate.

The IC 23 serves mainly to achieve a time function, but it is sometimes designed to cause the liquid crystal display element 15 to display images such as "fire extinguisher" and other appropriate illustrations, instead of or in addition to its time function.

The following explanation describes the operation of the above electronic circuit. When the jumper J of the slide switch 16 is in a state in which the contacts T$_1$ and T$_3$ are short-circuited, the input terminal of the NOR gate 22-1, which is connected to the contact T$_4$, is "1" and the output terminal thereof is "0". The switching transistor TR is thus kept cut off. This prevents current from being supplied to the light emitting diode LD, so that this LD is kept turned off. However, during this time current is supplied to the IC 23 through the resistance R$_6$, thereby enabling the IC to serve as a timer.

When the slide switch 16 is operated to cause the jumper J to short-circuit the contacts T$_2$ and T$_4$, the input terminal of the NOR gate 22-1, which is connected to the contact T$_4$, becomes "0". As a result, the output terminal of the NOR gate 22-1 is made "1", thereby making the switching transistor TR operative. The light emitting diode KD is thus turned on. When the output terminal of the NOR gate 22-1 becomes "1", the output terminal of the NOR gate 22-2 changes from "1" to "0" at substantially the same time. The capacitor C$_1$ therefore discharges its charged load according to a time constant associated with the resistance R$_3$ and when the potential between its terminals reaches a threshold level, the input terminal of the NOR gate 22-1 connected to the resistance R$_2$ becomes "1" and the output terminal of the NOR gate 22-1 becomes "0". The light emitting diode LD is thus turned off. The capacitor C$_1$ is now charged and when the load is thus returned to its original state, the light emitting diode LD is turned on. When this process is repeated, the light emitting diode LD is kept flickering.

The case where the jumper J short-circuits through contacts T$_3$ and T$_5$ is similar to that where the switching transistor TR is kept operative. A certain amount of current is therefore allowed to continuously flow to the light emitting diode LD, so that the light emitting diode LD can be kept turned on. The capacitor C$_2$ arranged side by side with the power source terminal of the IC 23 is intended to use its charged load as a power source so that the time function of the IC is not stopped even for a short time period during which the dry cells are replaced with new ones.

Figure 9:
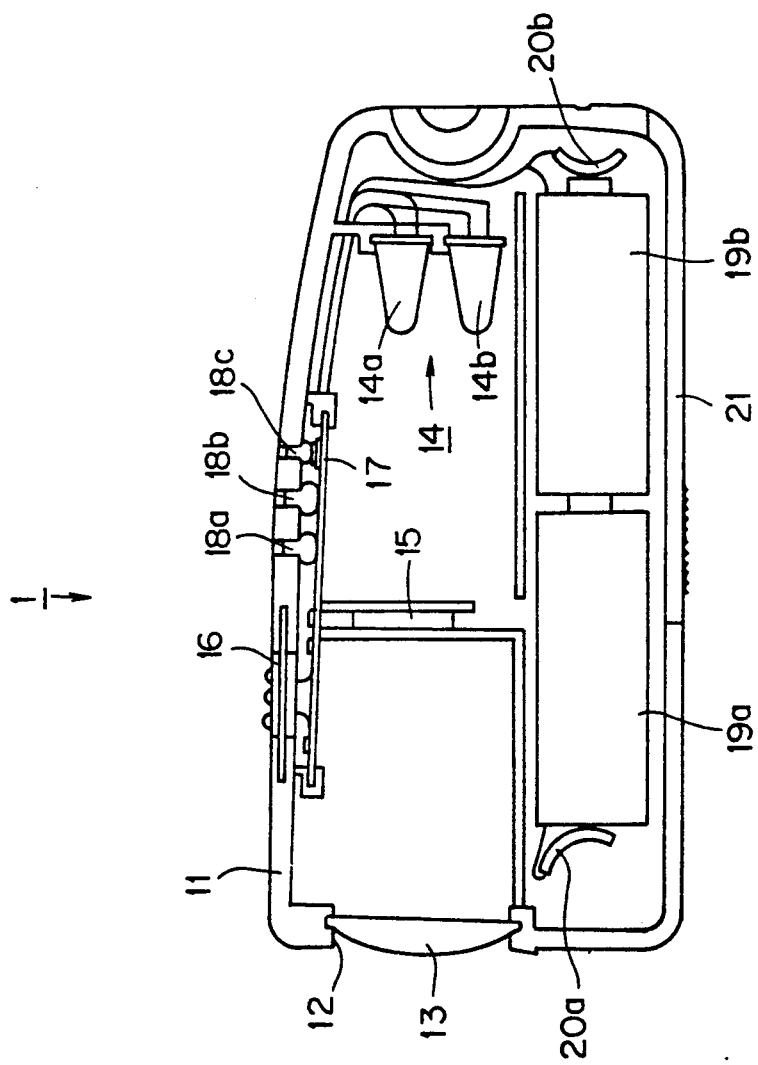
FIG. 9 is a configuration diagram showing another embodiment of the internal mechanism of the portable projection device applied with the present invention.
Figure 10:
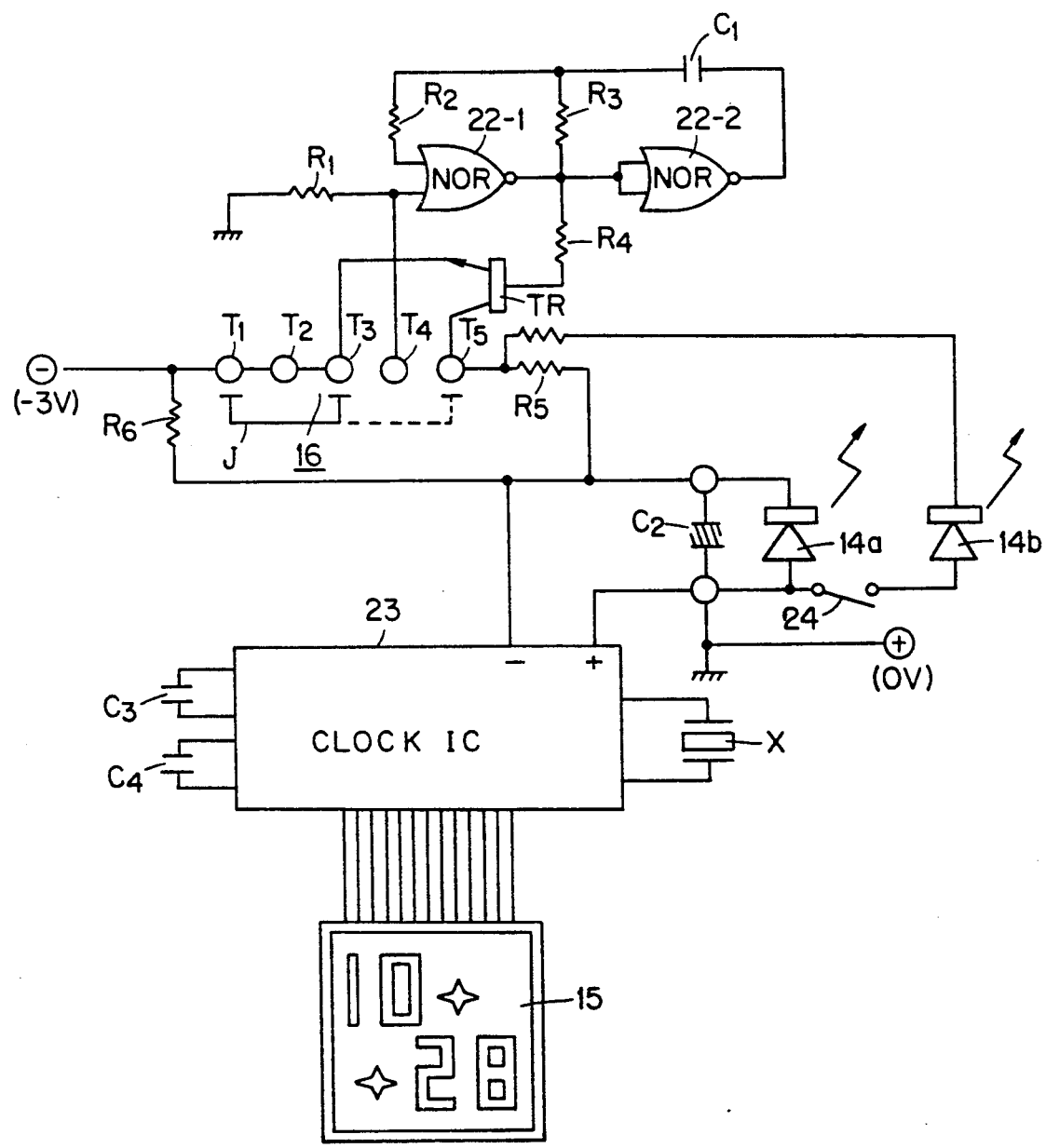
FIG. 10 is a block diagram of an another example of the electronic circuit used for the portable projection device applied with the present invention.

This embodiment can be provided with a plurality of light sources 14 as shown in FIG. 9. These light sources 14 can comprise a light emitting diodes 14a and 14b that have the similar relationship to the diodes applied to the first embodiment. FIG. 10 shows the block diagram of the electronic circuit thereof. The switch 24 in FIG. 10 is provided on the substrate 17, and can be operated by the time adjuster 18c not having, at the trip, a conductive rubber applied to the time adjusters 18a and 18b.

The lens 13 can be replaced with a composite lens system such as a detachable wide angle lens system or a wide angle lens system provided with focus adjusting mechanism.

The portable projection device of the present invention has the above-described arrangement and when it is fixed to the jacket of a person who rides a bicycle at night with a piece of engaging strip (with the trademarks VELCRO or MAGIC TAPE) attached to it and another piece of engaged strip pinned to the jacket, it can be used as a tail lamp, an alarm lamp or the like. When it is used as a timepiece, it may project time information formed on the liquid crystal display element onto a surface. Guide information indicating the presence of a fire extinguisher or the like, formed on the liquid crystal display element, can be easily attached to a fire extinguisher or the like on the hallway floor of a hotel, for example, and usually used as a guide lamp, projecting the term "fire extinguisher" on the wall, but as a leading lamp at the time of such emergency as fire occurs.

As described above, the portable projection device according to the present invention is small and easy to handle. It can be used for various means such as time and guide displays and alarm lamps. In addition, its light emitting means can be made to flicker when it is used as an alarm or guide lamp. Therefore, it can freely project images such as pictures and messages onto a surface of the wall and ceiling and it can also be used indoors and outdoors.

What is claimed is:

1. A portable projection device comprising
a case-like body,
a light-passing hold formed in a wall of said body,
a light-emitting means located within said body, opposite to said light-passing hole,
a power source located within said body for providing power to operate said light-emitting means,
a removable lens system covering said light-passing hole,
a display means within said body, interposed said light-emitting means and said light-passing hole, an image on said display means being projected from said portable projection device through said light-passing hole and said removable lens system when light is emitting from said light-emitting means,
a slidable switch having a plurality of operational positions, and
an electronic circuit means for controlling operation of said light-emitting means in response to said slidable switch being positioned to an operational position, said electronic circuit means including first and second interconnected NOR gates and a switching transistor.

2. The portable projection device according to claim 1, wherein said light emitting means comprises a high-brightness light-emitting diode.

3. The portable projection device according to claim 1, wherein said display means comprises a display film.

4. The portable projection device according to claim 1, wherein said display means comprises a liquid-crystal display element.

5. The portable projection device according to claim 1, wherein said electronic circuit means controls said light-emitting means to flicker.

6. The portable projection device according to claim 1, wherein said removable lens system comprises a composite lens system.

7. The portable projection device according to claim 1, wherein, a first contact position is connected to a collector of said switching transistor and to said light-emitting means, a second contact position is connected to a first input of said first NOR gate, and said first input of said NOR gate is also connected to ground, a third contact position is connected to an emitter of said switching transistor and to a negative electrode of said power source through a fourth and fifth contact position, an output of said first NOR gate is connected to first and second inputs of said second NOR gate and to a base of said switching transistor, and an output of said second transistor is connected to a second input of said first NOR gate through an RC circuit.

8. The portable projection device according to claim 7, further comprising a clock means connected to said power source for generating a time function, and said display means includes a liquid-crystal display element connected to said clock means for displaying said time function, wherein said time function is projected from said portable projection device.

9. The portable projection device according to claim 1, wherein said light-emitting means is a plurality of light emitting diodes of different brightness levels and said electronic circuit means controls said light emitting diodes to emit light simultaneously or selectively.

10. The portable projection device according to claim 9, wherein said plurality of light emitting diodes are of different colors.

* * * * *